US009546451B2

(12) United States Patent
Zhou

(10) Patent No.: US 9,546,451 B2
(45) Date of Patent: Jan. 17, 2017

(54) SURFACE TREATMENT COMPOSITION

(75) Inventor: Xiaoqi Zhou, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 133 days.

(21) Appl. No.: 14/375,130

(22) PCT Filed: Jan. 31, 2012

(86) PCT No.: PCT/US2012/023409
§ 371 (c)(1),
(2), (4) Date: Jul. 28, 2014

(87) PCT Pub. No.: WO2013/115809
PCT Pub. Date: Aug. 8, 2013

(65) Prior Publication Data
US 2015/0004425 A1 Jan. 1, 2015

(51) Int. Cl.
*C09D 11/54* (2014.01)
*B41M 5/52* (2006.01)
(Continued)

(52) U.S. Cl.
CPC .......... *D21H 19/385* (2013.01); *B41M 5/0017* (2013.01); *B41M 5/155* (2013.01);
(Continued)

(58) Field of Classification Search
CPC .... C09D 11/005; C09D 11/54; B41M 5/0017; B41M 5/52; B41M 5/5218; D21H 19/44; D21H 19/54; D21H 19/64
(Continued)

(56) References Cited

U.S. PATENT DOCUMENTS 3,352,705 A 11/1967 Moes et al.
5,182,175 A * 1/1993 Sakaki ................ B41M 5/5218 428/32.3

(Continued)

FOREIGN PATENT DOCUMENTS

CN 101522432 9/2009
CN 101678691 3/2010

(Continued)

OTHER PUBLICATIONS

Extended European Search Report dated Nov. 6, 2014, Applicant Hewlett-Packard Development Company, L.P., Application No./ Patent No. 12867099.9-1704 PCT/US2012023409.

(Continued)

*Primary Examiner* — Helene Klemanski
(74) *Attorney, Agent, or Firm* — Thorpe, North & Western L.L.P.

(57) ABSTRACT

A surface treatment composition includes a solution having a pH within a range of above 4 to 8 that includes metal cations produced in situ from a metal-containing substance having a $K_{sp}$ no greater than $1\times10^{-6}$ in a reaction with an acid having a pKa in a range of −3.0 to +3.5. The composition further includes an agent mixed with the solution that is either a surface sizing agent or a coating agent used on a paper substrate. A print media includes the composition applied to a paper substrate. Preparation of the composition includes reacting the metal-containing substance with the acid, adjusting the pH to above 4 to 8, and mixing the metal cation-containing solution with either the surface sizing or coating agents.

16 Claims, 1 Drawing Sheet

(51) Int. Cl.

| | |
|---|---|
| ***D21H 19/44*** | (2006.01) |
| ***D21H 19/54*** | (2006.01) |
| ***D21H 19/64*** | (2006.01) |
| ***D21H 19/38*** | (2006.01) |
| ***B41M 5/155*** | (2006.01) |
| ***B41M 5/00*** | (2006.01) |
| ***D21H 21/16*** | (2006.01) |

(52) U.S. Cl.
CPC ............ *B41M 5/52* (2013.01); *B41M 5/5218* (2013.01); *D21H 19/64* (2013.01); *D21H 21/16* (2013.01); *Y10T 428/31993* (2015.04); *Y10T 428/31996* (2015.04)

(58) Field of Classification Search
USPC .................... 106/217.01, 403, 404; 428/32.3
See application file for complete search history.

(56) References Cited

U.S. PATENT DOCUMENTS

| | | | | |
|---|---|---|---|---|
| 6,312,619 | B1 * | 11/2001 | Pope | C01F 7/026 252/363.5 |
| 6,585,365 | B1 | 7/2003 | MacMillan | |
| 6,670,002 | B1 | 12/2003 | Sekiguchi et al. | |
| 6,844,140 | B1 | 1/2005 | Wertz et al. | |
| 7,033,428 | B2 | 4/2006 | Drummond | |
| 8,507,054 | B2 * | 8/2013 | Zhou | B41M 5/52 428/32.3 |
| 8,678,543 | B2 * | 3/2014 | Zhou | B41M 5/5218 347/100 |
| 8,685,503 | B2 * | 4/2014 | Zhou | B41M 5/5218 428/32.3 |
| 8,927,074 | B2 * | 1/2015 | Fu | B41M 5/5218 428/32.3 |
| 9,034,953 | B2 * | 5/2015 | Zhou | B41M 5/52 106/156.23 |
| 2006/0162884 | A1 | 7/2006 | Gane et al. | |
| 2008/0081203 | A1 | 4/2008 | Knight et al. | |
| 2008/0090925 | A1 * | 4/2008 | Hladik | B41M 5/26 522/1 |
| 2008/0168919 | A1 | 7/2008 | Maehashi | |
| 2008/0174643 | A1 * | 7/2008 | Notoya | C09D 11/54 347/86 |
| 2008/0311384 | A1 * | 12/2008 | Toles | B41M 5/502 428/328 |
| 2009/0031922 | A1 * | 2/2009 | Rengaswamy | C09D 11/324 106/31.77 |
| 2009/0274855 | A1 | 11/2009 | Koenig et al. | |
| 2010/0028806 | A1 | 2/2010 | Patel et al. | |
| 2010/0092765 | A1 * | 4/2010 | Hager | B82Y 30/00 428/331 |
| 2010/0256260 | A1 * | 10/2010 | Liu | C09D 11/326 523/206 |
| 2011/0187788 | A1 * | 8/2011 | Fujioka | C09D 11/54 347/21 |
| 2011/0303113 | A1 | 12/2011 | Sarkisian et al. | |
| 2012/0142965 | A1 | 6/2012 | Gane et al. | |
| 2013/0243978 | A1 * | 9/2013 | Lindfors | B41M 5/52 428/32.21 |

FOREIGN PATENT DOCUMENTS

| | | |
|---|---|---|
| CN | 101765644 | 6/2010 |
| CN | 101861366 | 10/2010 |
| EP | 1550551 | 7/2005 |
| JP | 2007296637 | 11/2007 |
| WO | 2010014139 | 2/2010 |
| WO | 2010044795 | 4/2010 |
| WO | 2010146531 | 12/2010 |

OTHER PUBLICATIONS

International Search Report and the Written Opinion (ISRWO) of the International Searching Authority (ISR/KR) dated Oct. 18, 2012 (9 pages) for counterpart PCT patent application No. PCT/US2012/023409.

* cited by examiner

SURFACE TREATMENT COMPOSITION

CROSS-REFERENCE TO RELATED APPLICATIONS

N/A

STATEMENT REGARDING FEDERALLY SPONSORED RESEARCH OR DEVELOPMENT

N/A

BACKGROUND

Print media used in printing images usually undergo a surface treatment process, such as one or more of surface sizing and surface coatings during manufacture to improve print quality, print durability and reliability, and print finish. Regardless of the printing technology used, or regardless of the printing platform, the attributes of the printed image are important to end-users. Concomitantly, the materials used in the surface sizing and the surface coatings are important to the paper mills that produce the print media.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

Figure 1:
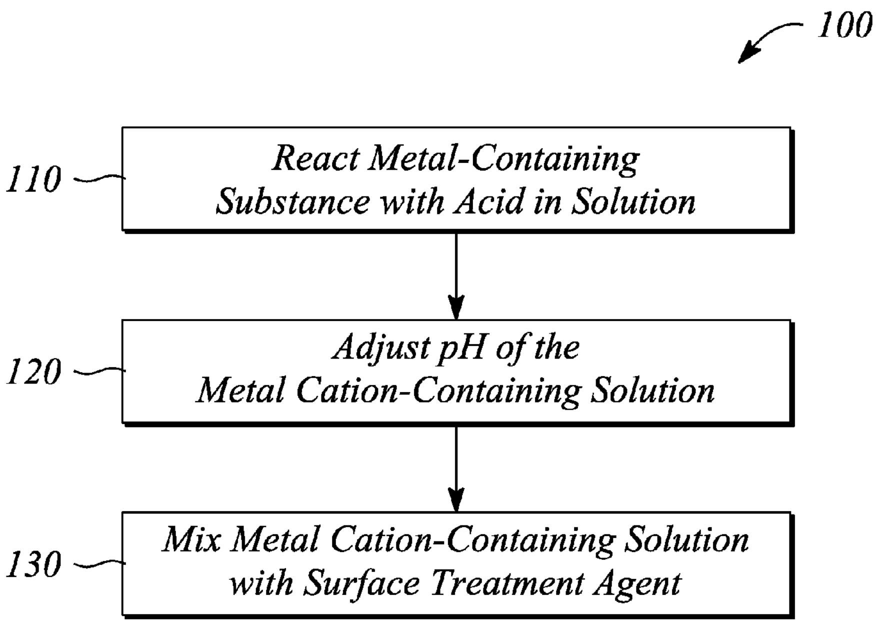
FIG. 1 illustrates a method of preparing a surface treatment composition according to examples in accordance with the principles described herein.

Certain examples have other features that are one of in addition to and in lieu of the features illustrated in the above-referenced figures. These and other features are detailed below with reference to the above-referenced figures.

DETAILED DESCRIPTION

Examples in accordance with the principles described herein are directed to a surface treatment composition that includes a metal cation-containing solution made via in situ ionization, a print media including the composition, and a method of preparing the surface treatment composition that includes in situ ionization of a metal-containing substance. In particular, the surface treatment composition comprises a surface treatment agent, namely either a surface sizing agent or a surface coating agent, mixed with a solution comprising metal cations produced in situ from a reaction between the metal-containing substance and an acid. The metal cations are dissolved in the solution and are present as free moving species in the solution (also referred to herein as the 'metal cation-containing solution'). The surface treatment composition according to the principles described herein is one of a surface sizing composition and a surface coating composition that improves print quality on print media without compromising the manufacturing equipment at the paper mill, for example.

The print media includes a cellulose fiber-based paper substrate and the surface treatment composition applied to the surface of the paper substrate, for example during paper manufacturing. The method of preparing the surface treatment composition includes ionizing a metal-containing substance in situ in an acid to form a metal cation-containing solution, and mixing the metal cation-containing solution either with a surface sizing agent to form a surface sizing composition or with a surface coating agent to form a surface coating composition to treat the surface of the paper substrate, for example during paper manufacturing. The metal-containing substance is in situ ionized by reacting the metal-containing substance with the acid in solution to create free moving or unassociated metal cation species dissolved in solution; and then the pH of the metal cation-containing solution is adjusted.

In some examples, the metal cation-containing solution is adjusted to have a pH within a range of above pH 4 to about pH 8. In some examples, the acid has a $pK_a$ in a range of about −3.0 to about +3.5. In some examples, the metal cations are divalent or multivalent cations. Moreover, in some examples, the metal-containing substance has a solubility product constant $K_{sp}$ of no greater than about $1\times10^{-6}$.

The metal cation-containing solution is prepared in situ and then mixed with the surface treatment agent before it is applied to a paper substrate, for example during manufacturing of the print media. When the surface treatment composition comprises the surface sizing agent, the surface treatment composition according to the principles described herein is applied at a surface sizing station to size the surface of the paper substrate during paper manufacture. When the surface treatment composition comprises the surface coating agent, the surface treatment composition according to the principles described herein is applied at a surface coating station, e.g., either an on-line coater with a paper machine or at a off-line coater, to coat the surface of the paper substrate during paper manufacture.

The surface treatment composition and print media according to the principles herein are useful in both analog and digital printing technologies, regardless of the printing platform for example, inkjet printing and laser printing. For example, digital printing continues to become a mainstream printing technology, improved compatibility of the print media with the digital printing technology remains a goal for manufacturers. Some specific methods have been used in manufacturing print media that provides certain improved compatibility with digital printing technology. For example, certain agents used in surface sizing and surface coatings of print media provide significant improvements in digital printed images but they also may bring disadvantages to the print media and the paper making equipment. In particular, multivalent metallic salts have been incorporated into the print media in recent years to facilitate separation of ink colorants or pigments from an ink vehicle of an inkjet ink and to facilitate bonding of anionic charged ink pigments with print media. Such an effect, which is sometimes called 'crashing of pigments' and 'fixing of pigments', can render the printed image fast drying coupled with good image quality and durability. Metallic cations in a surface treatment of a print media serve to destabilize ink pigment (colorant) from an ink vehicle in a stable ink dispersion when the ink mixture is applied to a surface of the print media to form an image. By destabilize, it is meant that the metallic cations in the print media surface disturb the equilibrium of the ink dispersion so that anionically charged ink pigment may readily destabilize and separate from the ink vehicle and bond to the metal cations in the surface treatment and be stably retained on the surface of the print media in the image (i.e., 'crashing' and 'fixing' of pigment).

To effectively crash and fix the pigment, the metallic salt is targeted to be water soluble to form the metallic cations, for example multivalent metal cations, in a treatment solution. Unfortunately, metallic salts (used to form metallic cations) that can be selected for this purpose are very limited and not economically available for paper mills to use due to high cost, for example. Calcium chloride ($CaCl_2$) is a common metallic salt that is most often used for this purpose for being inexpensive, relatively abundantly available and for having a targeted water solubility for paper manufacture. Other multivalent metallic salts include magnesium salts or aluminum salts, for example $MgCl_2$ or $AlCl_3$. However, $CaCl_2$ and other metal chloride salts are notorious for corrosion and ionic contamination for paper millers, if not monitored and controlled. In particular, the chloride anion from the metal chloride salts can build up over time, become corrosive to the paper mill equipment, and adversely impact wet end fiber retention during paper manufacture for example, when the salt-containing wet and dry brokes are recycled back to the furnish tank of the paper mill. This may adversely impact wet end fiber retention during paper manufacturing.

Moreover, both $CaCl_2$ and $MgCl_2$, for example, are also highly moisture absorptive, which makes ions even more mobile and thus, can adversely reduce electrical volume and surface resistivity of the paper being manufactured. Unfortunately, the drop in these paper electrical properties can facilitate some printing problems such as toner-drop-off in laser printing, and produce a defective printout. During paper manufacturing, high moisture content inside the paper web also causes some common engineering challenges, such as 'piping' during conversion of the paper roll to paper sheets of print media. Other metallic salts, such as inorganic double salts or organic salts, for example, are one or more of costly, not readily available, have processing issues due to low solubility, and present logistic challenges to paper mills, for example.

According to the principles described herein, the method of preparation of a surface treatment composition, which includes in situ ionization of a metal-containing substance, effectively provides the metallic cations for crashing and fixing of anionic ink pigments on print media without the use of a metallic salt, for example. In some examples, the surface treatment composition, the print media that includes the surface treatment composition, and the method of preparation thereof according to the principles described herein effectively overcome the problems mentioned above associated with using water soluble metallic salts.

As used herein, the article 'a' is intended to have its ordinary meaning in the patent arts, namely 'one or more'. For example, 'a cation' generally means one or more cations and as such, 'the cation' means 'the cation(s)' herein. The phrase 'at least' as used herein means that the number may be equal to or greater than the number recited. The phrase 'no greater than' as used herein means that the number may be equal to or less than the number recited. The term 'about' as used herein means that the value recited is within the normal tolerances of the equipment used to measure the value; or in some examples, the value may differ by plus or minus 20%, or plus or minus 15%, or plus or minus 10%, or plus or minus 5%, or plus or minus 1%, for example. The term 'between' when used in conjunction with two numbers such as, for example, 'between about 2 and about 50' includes both of the numbers recited. Any ranges of values provided herein include values within or between the provided ranges. The term 'substantially' as used herein means a majority, or almost all, or all, or an amount with a range of about 51% to 100%, for example.

Also, any reference herein to 'top', 'bottom', 'upper', 'lower', 'up', 'down', 'back', 'front', 'left' or 'right' is not intended to be a limitation herein. The designations 'first' and 'second' if used herein is for the purpose of distinguishing between items, such as 'first side' and 'second side', and are not intended to imply any sequence, order or importance to one item over another item or any order of operation, unless otherwise indicated. Moreover, examples herein are intended to be illustrative only and are presented for discussion purposes and not by way of limitation. Herein, logarithmic acid dissociation constants $pK_a$ are values reported for in water at about 25° C.; all values measured for pH were measured at about 25° C.; and all solubility product constants $K_{sp}$ are values reported for in deionized (DI) water at about 25° C., unless otherwise indicated. Moreover, the terms 'metal' and 'metallic', e.g., 'metal cation' and 'metallic cation', are used interchangeably herein to mean a cation of a metal element.

As used herein, an 'acid' is defined as a substance that acts as a proton donor in solution or for example, a substance that increases a concentration of hydronium ions ($H_3O+$) in solution. The acid may be monoprotic, polyprotic or a mixture of both. The acid suitable to practice the principles described herein is further defined as having a logarithmic acid dissociation constant $pK_a$ that is within a range of about −3.0 to about +3.5. For example, the logarithmic acid dissociation constant $pK_a$ of the acid may be within a range of −2.7 to +3.0, or in some examples, within the range of −2.6 to +2.5, or within the range of −2.5 to +2.0, or within the range of −2.4 and +1.0, for example. In some examples, the acid further is an inorganic acid when the $pK_a$ is between about +2.0 and about +3.5.

In some examples, the acid includes, but is not limited to, nitric acid ($HNO_3$, e.g., $pK_a$ of about −1.64), sulfuric acid ($H_2SO_4$, e.g., $pK_{a1,\ 2}$ of about −3, about 1.9), chromic acid ($H_2CrO_4$, e.g., $pK_a$ of about −0.98), phosphorous (phosphonic) acid ($H_3PO_3$, e.g., $pK_a$ of about 2.0), phosphoric acid ($H_3PO_4$, e.g., $pK_{a1}$ of about 2.12), pyrophosphoric (diphosphoric) acid ($H_4P_2O_7$, e.g., $pK_{a1}$ of about 1.52), permanganic acid (or hydrogen permanganate) ($HMnO_4$, e.g., $pK_{a1}$ of about −2.25), or a mixture of two or more acids where the logarithmic acid dissociation constant $pK_a$ of the acid or mixture is within the range of about −3.0 to about +3.5. In contrast, a weak acid, such as organic acids including citric acid ($C_6H_8O_7$, e.g., $pK_{a1\text{-}3}$ ranging from about +3.0 to about +5.5) and acetic acid ($C_2H_4O_2$, e.g., acidity $pK_a$ of about +4.8) are not sufficiently reactive with metal-containing substances to be suitable for producing the metal cation-containing solution of the surface treatment composition according to the examples herein.

The pH of the metal cation-containing solution is adjusted to be within a range of above pH 4 to about pH 8 using a buffer, for example sodium hydroxide. The pH of the metal cation-containing solution is controlled to be within the range of above pH 4 to about pH 8 for use with the surface sizing agents or the surface coating agents in the surface treatment composition. The surface sizing agents and surface coating agents are more compatible with alkaline conditions than acidic conditions. Therefore, a pH balance of the metal cation-containing solution is maintained to be in the range of above pH 4 to about pH 8 to provide a compatible environment for the surface treatment agents. In some examples, the pH of the metal cation-containing solution may be adjusted to within the range of pH 4.2 to pH 8.0, or in some examples within the range of pH 4.5 to pH 7.0, or within the range of pH 5.0 to pH 7.5, or within the range of pH 5.0 to pH 7.0, or within the range of pH 5.0 to pH 6.5, or within the range of pH 5.5 to pH 7.5.

The 'metal-containing substance' according to the principles described herein is defined as a substance that comprises a metal, a metal alloy, or a metal compound having a solubility product constant $K_{sp}$ that is less than or equal to about $1\times10^{-6}$ and therefore, is substantially free of ionic species (i.e., cations and anions) in water at or below about 25° C., i.e., the substance is not a salt, by definition. In some examples, the metal-containing substance is one of a metal, a metal alloy, a metal compound, or a combination or mixture thereof, as defined herein. By 'substantially free', it is meant no more than about 1000 parts per million (ppm) of ionic species are present when the metal-containing substance is in water at or below about 25° C. For example, the solubility product constant $K_{sp}$ of the metal-containing substance may be less than or equal to $1.10\times10^{-6}$, or in some examples, less than or equal to $1.00\times10^{-6}$, or less than or equal to $0.90\times10^{-6}$, or less than or equal to $0.75\times10^{-6}$, or less than or equal to $0.50\times10^{-6}$. In some examples, the solubility product constant $K_{sp}$ of the metal-containing substance is less than or equal to about $1\times10^{-7}$, or less than or equal to about $1\times10^{-8}$. In particular, the metal-containing substance is considered substantially water insoluble.

Further by definition herein, the 'metal-containing substance' is a substantially water insoluble, non-salt substance, wherein the metal, the metal alloy or the metal species of the metal compound includes an element that in some examples, is selected from Group I metals, Group II metals, Group III metals and transition metals. In some examples, the metal element includes, but is not limited to, sodium, potassium, calcium, copper, nickel, zinc, magnesium, barium, iron, aluminum, chromium or a mixture or combination thereof. The metal element provides the source of a metal cation in solution. In some examples, the metal element is capable of generating a multivalent metal cation. Moreover, a 'metal cation-containing solution' is defined herein as metal cations that are present as free moving or unassociated cationic species dissolved in a solution in which the metal cations are produced from an in situ ionization reaction between the metal-containing substance and the acid, as further described herein.

In some examples, the metal-containing substance further comprises an element selected from one or more of Group IV, Group V, Group VI, and Group VII to form an anion species in solution. In some examples, the metal-containing substance includes, but is not limited to, a metal nitrate, a metal sulfate, a metal sulfite, a metal phosphate, a metal oxide, a metal hydroxide, a metal carbonate, a metal acetate, or a mixture of two or more of the above, that is water insoluble and has a solubility product constant $K_{sp}$ of no greater than about $1\times10^{-6}$, as provided above. For example, the metal-containing substance may include, but is not limited to, calcium carbonate, aluminum sulfate, magnesium oxide, calcium oxide, or a mixture of two or more of the above. Calcium carbonate, in particular, is useful for the metal-containing substance because it already has wide use in the paper manufacturing industry as a wet end filler and as a dry end coating pigment and is readily available at low cost.

In particular, any metal compound that generates anionic species in water that is able to initialize corrosion to paper making equipment is excluded from the suitable metal-containing substances, by definition herein. Examples of the anionic species that could catalyze corrosion of paper making equipment include, but are not limited to, chloride ion ($Cl^-$), bromide ion (Br), iodide ion (F), hypochlorite ion ($ClO^-$), chlorite ion ($ClO_2^-$), chlorate ion ($ClO_3^-$), and perchlorate ion ($ClO_4^-$). Therefore, in some examples by further definition herein, the metal-containing substance is substantially halogen free; and in some examples, the metal-containing substance is substantially chloride free.

The paper substrate comprises a raw cellulose fiber-based material of one or more of hardwood fibers, softwood fibers and recycled fibers, for example. During manufacturing, one or more fillers and additives may be added to the raw cellulose fiber-based material as the paper web is formed. The fillers and additives include, but are not limited to, inorganic fillers, pigments, internal sizing agents, optical brighteners, fixers, pH adjustors, emulsification products, strengtheners, and coloring agents. The fillers and additives are provided to the raw cellulose fiber-based material to render the paper substrate one or more of smooth, durable, strong, porous or nonporous, and water resistant, for example.

Examples of inorganic fillers and pigments include, but are not limited to, ground calcium carbonate, precipitated calcium carbonate, titanium dioxide, kaolin clay, silicates, plastic pigment, alumina trihydrate and combinations of any of the above. Examples of internal sizing agents include, but are not limited to, one or more of metal salts of fatty acids, fatty acids, alkyl ketene dimer (AKD) emulsification products, epoxidized higher fatty acid amides, alkenyl acid anhydride emulsification products, alkylsuccinic acid anhydride (ASA) emulsification products, and rosin derivatives. Optical brightening agents (OBA) include, but are not limited to, disulfonated stilbenes, for example. Fixers or binders include, but are not limited to, polyvinyl alcohol, ethers, latexes, and styrene acrylate copolymers, for example. In some examples, the paper substrate may include about 1% to about 40% filler by weight.

According to some examples of the principles described herein, a surface treatment composition is provided. The surface treatment composition comprises a solution having a pH within a range of above pH 4 to about pH 8 that comprises metal cations produced in situ from a metal-containing substance in an ionization reaction with an acid (i.e., metal cation-containing solution, as defined herein). The acid has a $pK_a$ in a range of about −3.0 to about +3.5. The metal-containing substance has a solubility product constant of no greater then about $1\times10^{-6}$. The surface treatment composition further comprises a surface treatment agent used in the surface treatment of a paper substrate in the manufacture of a paper print media. The surface treatment agent is mixed with the metal cation-containing solution.

In some examples, the surface treatment agent mixed with the metal cation-containing solution is a surface sizing agent to form a surface treatment composition according to an example herein. In some examples, the surface sizing agent includes, but is not limited to, a starch (e.g., cationic, anionic, amphoteric) including one or more of corn starch, potato starch and other starches from various natural sources, for example, chemical modified cationic corn starch from Penford Products Company, Cedar Rapids, Iowa.

In some examples, the surface treatment agent mixed with the metal cation-containing solution is a surface coating agent to form the surface treatment composition according to another example herein. The surface coating agent includes an inorganic filler and an organic binder. Inorganic fillers include, but are not limited to, calcium carbonate (ground (GCC) or precipitated (PCC)), aluminum silicate, mica, magnesium carbonate, silica, alumina, boehmite, talc, kaolin clay, or calcined clay, or combinations of two or more of any of the above. Inorganic fillers may be obtained from Specialty Minerals, Inc. of Bethlehem, Pa., USA or Omya North America. Other examples include, but are not limited to, either porous clays or calcium carbonates that are reaction products of a respective clay or calcium carbonate with colloidal silica; or particles of any of titanium dioxide, silicon dioxide, aluminum trihydroxide, or zirconium oxide, for example, inter-calcined into structured clay or calcium carbonates, for example, and combinations of two or more of any of the above. Organic binders include, but are not limited to, one or both of water-based binder and a water dispersible binder including, but not limited to, latex, polyvinyl alcohol (PVA), starch, styrene-butadiene, acrylates, or combinations or mixtures of two or more thereof.

In addition, functional additives may be mixed with the surface treatment agent in the metal cation-containing solution. The functional additives that may be mixed with the surface treatment agents include, but not are limited to, an OBA (e.g., a Leucophor® OBA from Clariant International Ltd., Muttenz, Switzerland (CH)), an OBA carrier, a biocide (e.g., from Buckman Laboratories, Memphis, Tenn. or Ashland Inc., Covington, Ky.), a color dye, and a defoamer or anti-foaming agent (e.g., from Performance Process Inc., Illinois or BASF Corp., Germany).

Some examples in accordance with the principles described herein are directed to a method of preparing a surface treatment composition used in paper manufacturing that includes in situ ionization of a metal-containing substance. The surface treatment composition comprises a surface treatment agent and a metal cation-containing solution. The term 'in situ' refers to the formation of water soluble metallic cations simultaneously with the preparation of the metal cation-containing solution. In some examples, the surface treatment composition is any of the surface treatment compositions described above. FIG. 1 illustrates a flow chart of the method (100) of preparing a surface treatment composition according to an example of the principles described herein.

The method (100) of preparing comprises reacting (110) a metal-containing substance with an acid in solution to produce the metal cation-containing solution comprising dissolved metal cations that are formed via in situ ionization. The metal-containing substance has a solubility product constant $K_{sp}$ of no greater than about $1\times10^{-6}$ and is further defined above. In some examples, the metal-containing substance is any of the metal-containing substances described above. The acid has $pK_a$ in a range of about −3.0 to about +3.5. In some examples, the acid is any of the acids described above. The method (100) of preparing further comprises adjusting (120) a pH of the produced metal cation-containing solution to within a range of above pH 4 to pH 8. In some examples (not illustrated), the method of preparing further comprises filtering the produced metal cation-containing solution to remove any solid impurities in the solution.

The method (100) of preparing a surface treatment composition further comprises mixing (130) the metal cation-containing solution with an agent to form a surface treatment composition for a paper substrate during manufacturing of print media. In some examples, the metal cation-containing solution is mixed (130) with a surface sizing agent to form a surface sizing composition for the paper substrate. In some examples, any of the surface sizing agents and functional additives described above may be used. In some examples, the metal cation-containing solution is mixed (130) with a surface coating agent to form a surface coating composition for the paper substrate. In some examples, any of the surface coating agents and functional additives described above may be used.

The surface treatment composition is applied to the paper substrate during paper manufacture. For example, the surface sizing composition according to some examples herein may be applied on the paper substrate using one or more of a film size press, a rod size press and a pond size press during paper manufacturing to form the print media according to some examples herein. In another example, the surface coating composition according to some examples herein may be applied on the paper substrate using a paper machine on-line coating applicator or off-line coating applicator device such as film sizing press, slot die application, roller application, fountain curtain application, blade application, rod application, air knife application, gravure application, and air brush application during paper manufacturing to form a print media according to some examples herein. The applied surface coating composition is dried by convection, conduction, infra-red radiation, atmospheric exposure, or a combination of one or more of these, for example. In some examples, the paper substrate both receives the surface sizing composition during a sizing step in the paper manufacturing process and receives the surface coating composition during a surface coating step in the paper manufacturing process to form a print media according to some examples herein.

Some examples of the principles described herein include a print media. The print media comprises a paper substrate that comprises cellulose fibers. In some examples, the paper substrate may be any of the paper substrates described above. The print media further comprises a surface treatment composition applied to the paper substrate during manufacturing of the paper print media. The surface treatment composition may include one or both of a surface sizing composition applied during sizing of the paper substrate and a surface coating composition applied during coating of the paper substrate.

For print media examples that comprise the surface sizing composition as the surface treatment composition, the surface sizing composition comprises a surface sizing agent mixed in a solution having a pH within a range of above pH 4 to about pH 8 that comprises metal cations produced from in situ ionization of a metal-containing substance in a reaction with an acid in solution. The acid has a $pK_a$ in a range of −3.0 to +3.5 and the metal-containing substance has a solubility product constant $K_{sp}$ of no greater than $1\times10^{-6}$. In some examples, any of the surface sizing agents described above may be used. Moreover in some examples, any of the acids described above may be used and any of the metal-containing substances described and defined above may be used.

For print media examples that comprise the surface coating composition as the surface treatment composition, the surface coating composition comprises a surface coating agent mixed in a solution having a pH within a range of above pH 4 to about pH 8 that comprises metal cations produced from in situ ionization of a metal-containing substance in a reaction with an acid having a $pK_a$ in a range of −3 to +3.5. The metal-containing substance has a solubility product constant $K_{sp}$ of no greater than $1\times10^{-6}$. In some examples, any of the surface coating agents described above may be used. Moreover in some examples, any of the acids and the metal-containing substances, as described above, may be used. In some examples, the amount of metallic cation in the surface treatment composition of the print media is within a range of about 0.003 Molar (M)

metallic cations per square meter ($m^2$) of the paper substrate to about 0.05 M metallic cations/$m^2$ of the paper substrate ($M/m^2$). In some examples, the amount of metallic cations is within the range of about 0.002 $M/m^2$ to about 0.04 $M/m^2$, or about 0.001 $M/m^2$ to about 0.03 $M/m^2$, or about 0.001 $M/m^2$ to about 0.01 $M/m^2$, for example.

In an example of manufacturing the print media having the surface sizing composition, the metal-containing substance is charged into an acid tank to react the metal-containing substance with the acid in solution and produce water soluble metal cations in solution via in situ ionization. The thus formed metal cation-containing solution is filtered and transferred to a run tank where the pH of the solution is adjusted, for example to be within a range of pH 5 to pH 6.5 to avoid exposing the paper substrate to strong acid conditions. The solution is mixed with pre-cooked starch solution and other functional additives, as mentioned above, to make the surface sizing composition, e.g., having at least about 40 parts metal cation-containing solution per 100 parts of starch. The surface sizing composition is applied to the paper substrate using conventional sizing methods and equipment (e.g., film sizing press, etc.).

In another example of manufacturing the print media having the surface coating composition, the metal cation-containing solution is prepared as indicated in the previous paragraph. The solution is mixed with surface coating agents such as inorganic fillers, organic binders and other functional additives to formulate the surface coating composition. In some examples, an amount of metal cation-containing solution in the surface coating composition is about 5 parts to about 25 parts by total weight. In some examples, an amount of metal cation-containing solution in the surface coating composition is about 5 parts to about 20 parts by total weight, or about 5 parts to about 15 parts by total weight, or about 10 parts by total weight, for example. In some examples, an amount of the inorganic filler is about 80 parts to about 120 parts by total weight, and an amount of organic binder is about 7 parts to about 15 parts by total weight. In some examples, the amount of the inorganic filler is about 90 parts to about 110 parts by total weight, and an amount of organic binder is about 10 parts by total weight. The composition is applied to the paper substrate using conventional coating methods (e.g., application via rod, blade, air knife or curtain coaters).

Specific examples and evaluations thereof are provided below.

EXAMPLES

All measured values are within measurement tolerance for the equipment used, unless otherwise indicated.

Preparation of Metal Cation-Containing Solution, Example 1 (Relatively Moderate Acid)

40.274 kg deionized (DI) water was added to a plastic container. 1.726 kg of 73% $HNO_3$ (supplied by Aldrich Inc., MO) was added into the container of DI water with slow stirring to form a diluted acid solution. 1.00 kg ground calcium carbonate (GCC) powder, Omyafil (supplier by Omya Inc., VT), was added into the diluted acid solution with moderate stirring until reaction was completed, as indicated by all GCC being dissolved to form a metal cation-containing solution. This solution was transferred into another container through 200 micrometer filters to remove any solids impurities.

Preparation of Metal Cation-Containing Solution, Example 2 (Weak Organic Acid)

11.520 kg DI water was added into a plastic container. 1.280 kg of anhydrous citric acid (supplied by Aldrich Inc., MO) was added into the container of DI water with slow stirring. 1.00 kg ground calcium carbonate (GCC) powder, Omyafil (supplier by Omya Inc., VT), was added into the diluted acid solution with moderate stirring until reaction was completed to form a metal cation-containing solution. This solution was transferred into another container through 200 micrometer filters to remove any solids impurities.

Examples 3-7 of Different pH

Five samples of Example 1 above were placed in separate vessels and labeled Examples 3-7. The pH of the five samples was adjusted to a pH ranging from about pH 5 to a pH of about pH 12 by adding 5% NaOH solution.

Examples 8-12 of Different pH

Five samples of Example 2 above were placed in separate vessels and labeled Examples 8-12. The pH of the second five samples was also adjusted to a pH ranging from about pH 5 to a pH of about pH 12 by adding 5% NaOH solution. A pH meter used for pH measurements and adjustments herein was model SymPHony SP70P by VWR International, LLC, Radnor, Pa.

Optical Density and Turbidity of Examples 3-12:

The pH-adjusted solutions of Examples 3-12 were each applied to a paper sample having no surface sizing using a No. 8 Mayer rod and then dried. The paper substrate was supplied by JK Papers, India, with a basis weight of 75 gram per square meter (gsm). A Hewlett Packard water-based pigment ink, HP A50, was drawn down on the treated and dried paper samples using a No. 0 Mayer rod and then dried. The optical density of the ink-drawn samples (respectively labeled Examples 3-12) was measured with a Spectro-densitometer Model 938, supplied by X-rite, Green Rapids, Mich. The setting used was ANSI status A and the comparative results are reported for an average of three measurements. The results were reported in Table 1. The turbidity of the pH-adjusted solutions (also respectively labeled Examples 3-12) were observed by eye and reported in Table 1. As Comparison 1, a paper sample (same JK paper material as described above for Examples) having no surface sizing was treated with a 5% calcium chloride solution using a No. 8 Mayer rod and then dried. Pigmented ink was drawn down on the treated and dried paper Comparison 1 sample using a No. 0 Mayer rod and then dried. The same pigment ink, HP A50, used for the Examples was used. As Comparison 2, HP A50 pigment ink was drawn down on a paper sample (JK paper, as above) having no surface sizing and no surface treatment using a No. 0 Mayer rod and then dried.

The results in Table 1 show that print quality, as measured by optical density (KOD), remained fairly consistent and of very good print quality for Examples 3-7 where a relatively moderate acid was used regardless of pH. Moreover, the turbidity of the metal cation-containing solutions remained clear when the pH was adjusted to be within a range of above pH 4 to about pH 8, or more specifically to within the range of about pH 5 and about pH 8.

TABLE 1

| | pH | KOD | Turbidity of Solution |
|---|---|---|---|
| Metal Cation-containing Solutions prepared from $HNO_3$ (Example 1): | | | |
| Example 3 | 4.92 | 1.46 | Clear |
| Example 4 | 6.64 | 1.52 | Clear |
| Example 5 | 8.12 | 1.51 | Clear (-) |
| Example 6 | 9.04 | 1.50 | Very small particles |
| Example 7 | 11.81 | 1.50 | Precipitation |
| Metal Cation-containing Solutions prepared from Citric Acid (Example 2): | | | |
| Example 8 | 4.92 | 0.75 | Clear |
| Example 9 | 6.67 | 0.85 | Clear |
| Example 10 | 8.01 | 0.87 | Very small particles |
| Example 11 | 8.88 | 0.86 | Very small particles |
| Example 12 | 11.88 | 0.87 | Precipitation |
| Comparative 1: 5% $CaCl_2$ Solution | 8.05 | 1.53 | Clear |
| Comparative 2: Paper without Treatment | NA | 0.70 | NA |

However, while the print quality remained fairly consistent regardless of pH for Examples 8-12 where a weak organic acid was used, the print quality of Examples 8-12 was not as good when compared to Examples 3-7 using the relatively moderate acid. Moreover, the turbidity of the metal cation-containing solutions of Examples 8-12 where a weak organic acid was used remained clear only for the pH samples that were adjusted to be within a range of above pH 4 to about pH 7, or more specifically to within about pH 5 and about pH 6.5. The turbidity increased at pH 8 and above. As such, metal cation-containing solutions made from an in situ ionization reaction between a metal-containing substance and a relatively moderate acid have significantly improved print quality and image performance, including, but not limited to, over metal cation-containing solutions made from a weak organic acid. Moreover, in general, a pH of the metal cation-containing solution adjusted to be less than pH 4, or i.e., more acidic conditions, is not favorable to paper making processing and the fillers inside paper base are readily attacked by an acidic solution.

Preparation of a Surface Sizing Composition (Example 13)

A chemically modified corn starch, Penford® Gum 280 from Penford Products Co., IA, was charged into a pre-water loaded heated starch cooker in a ratio to make 8% solid content. The starch solution was heated at 90° C. and was stirred using moderate stirring until no solid particles were observed. The starch solution was allowed to cool. The metal cation-containing solution of Example 1 was mixed with the cooled starch solution in various sample ratios ranging from 0 parts metal cation-containing solution/100 parts of starch to 80 parts metal cation-containing solution/100 parts of starch to generate surface sizing composition samples.

Preparation of Paper Samples and Print Quality:

Various sample ratios of Example 13 were applied to a non-surface sized paper (JK paper as described above) using a No. 8 Mayer rod and then dried to form a treated paper. HP A50 pigment ink was drawn down on the treated paper using a No. 0 Mayer rod and dried. The optical density (KOD) of the ink was measured using the Spectro-densitometer Model 938, supplied by X-rite, Green Rapids, Mich. The setting used was ANSI status A and the comparative results are reported for an average of three measurements. The measurements were plotted on a graph illustrated in FIG. 2. Moreover, Comparative samples were prepared by applying the same pigment ink to off-the-shelf commercial papers, Everyday Paper made by Hewlett-Packard (HP, USA) and JK copier paper by JK (India), both of which contained calcium chloride. The KOD measurements of the comparative samples were 1.36 and 1.29, respectively.

Figure 2:
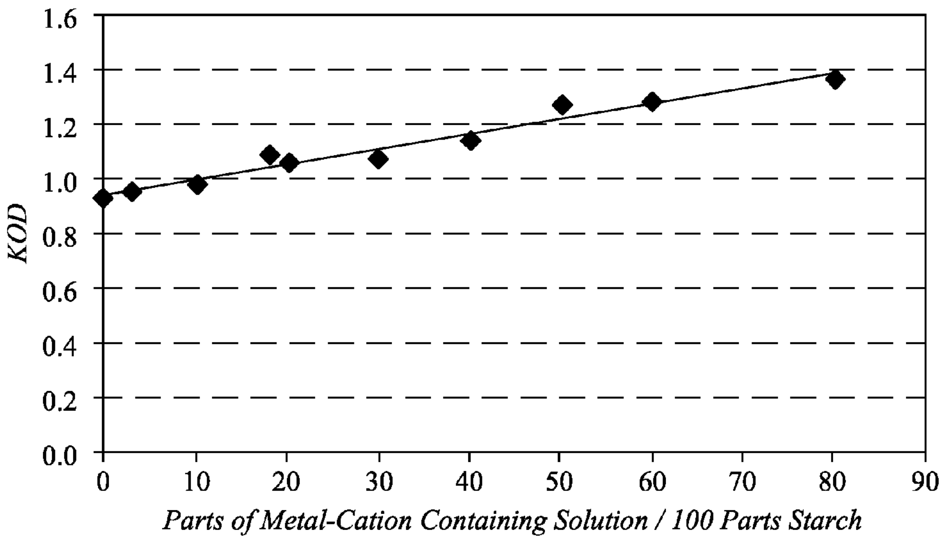
FIG. 2 illustrates a graph of optical density versus a ratio of metal cation-containing solution to starch in a surface sizing composition according to an example in accordance with the principles described herein.

The results illustrated in FIG. 2 show that the black color optical density KOD had a linear increase with increasing concentration of metal cation-containing solution in the starch solution. The surface sizing composition made with the metal cation-containing solution of Example 1 achieved the same KOD, and in some examples better KOD, than the $CaCl_2$ comparative samples when the ratio of metal cation-containing solution/starch was greater than 40 parts/100 parts (e.g., about 50 parts metal cation-containing solution/100 parts of starch to about 80 parts metal cation-containing solution/100 parts of starch). As such, the metal cation-containing solution may replace some of the high cost starch in surface sizing and still obtain the same print quality performance.

Starch Replacement Samples (Examples 14-18) and Tests

Those samples of surface sizing composition of Example 13 having a ratio of metal cation-containing solution (of Example 1)/starch of 30 parts/100 parts to 80 parts/100 parts were applied to non-surface sized paper to make Examples 14-18. One of the functions of the starch used in surface sizing of paper during manufacture is to improve the paper surface strength and ability against picking during contact printing. The surface strength or resistance to picking of the Examples 14-18 was evaluated using TAPPI wax pick-up method, Standard T 459. The Examples 14-18 (without pigment ink) were evaluated using a wax pick strength test having Wax numbers 12-18. Table 2 shows the results of the Examples 14-18 as well as for Comparative Samples 3-5 as controls. Comparative Sample 3 was HP Everyday paper, Comparative Sample 4 was JK (India) copier paper, and as a no-salt control, Comparative Sample 5 was JK (India) copier paper base without surface sizing (e.g., without starch and without $CaCl_2$). The copier paper is designed to be use for laserjet printing, which is a contact printing method, and surface strength of copier paper is of particular interest to users and manufacturers.

Table 2 shows that the paper surface strength is not adversely impacted by lower starch loading (i.e., higher metal cation-containing solution loading), since no change in results was observed whether the ratio of metal cation-containing solution to starch was 80 parts/100 parts or was 30 parts/100 parts. In fact, the Examples 14-18 exhibited the same results as the off-the-shelf commercial products, i.e., Comparative Samples 3-4. Comparative Sample 5, the no-salt control with no surface treatment, showed relatively lower surface strength.

Moisture Content, Surface Resistivity and Volume Resistivity:

Surface Sizing Composition Samples, Example 19 (having 0 parts metal cation-containing solution (Example 1)/100 parts starch) and Example 20 (having 50 parts metal cation-containing solution (Example 1)/100 parts starch) were prepared and applied to non-surface sized JK paper (same JK paper as above examples) using the No. 8 Mayer rod and dried. The Surface Sizing Composition Samples, Examples 19 and 20, were evaluated for moisture uptake, surface resistivity and volume resistivity measurements and compared to measurements for controls, Comparative Sample 6 (HP Everyday Colorlok paper with $CaCl_2$), Comparative Sample 7 (JK (India) copier paper with $CaCl_2$), and to Comparative Sample 8 (No. 4102 copy paper (having no $CaCl_2$) from Xerox (USA)) as a no-salt control. The samples were first stabilized in a 23° C./50% relative humidity room for 24 hours and then the weight of the samples was measured using an analytic balance. The samples were then moved to a 30 C/80% relative humidity chamber for 14 hours and the weight of the samples was measure again. The moisture uptake for the samples was calculated by dividing the weight increase (weight difference under two weight condition) to the original weight in the 23° C./50% relative humidity room and listed in Table 3. The resistivity is measured by a Hiresta-Up machine (Model: MCP-HT 450) made by Mitsubishi Chemical Corporation, JP).

TABLE 2

| | Metal Cation Solution parts/100 parts of Starch | Wax No. 12 | Wax No. 13 | Wax No. 14 | Wax No. 16 | Wax No. 18 |
|---|---|---|---|---|---|---|
| Example 14 | 30 | pass | pass | pass | pass | fail |
| Example 15 | 40 | pass | pass | pass | pass | fail |
| Example 16 | 50 | pass | pass | pass | pass | fail |
| Example 17 | 60 | pass | pass | pass | pass | fail |
| Example 18 | 80 | pass | pass | pass | pass | fail |
| Comparative 3: HP everyday paper | NA | pass | pass | pass | pass | fail |
| Comparative 4: JK (India) copier paper | NA | pass | pass | pass | pass | fail |
| Comparative 5: JK (India) copier paper base (no surface sizing) | NA | pass | pass | pass | fail | fail |

A principle of these tests was to demonstrate that the metal cation produced by in situ ionization has no any adverse effect on moisture absorption. The results in Table 3 illustrate that the Example 20 paper sample which was surface sized using 50 parts metal cation-containing solution (Example 1)/100 parts starch has comparable absorption to the Comparative Samples even at high moisture conditions and accordingly, Example 20 even maintains about the same electrical resistivity as the Comparative paper samples having no $CaCl_2$. As such, the Example 20 may represent that paper comprising the surface sizing composition of the examples according to the principles herein may help maintain an excellent performance even in electrophotographic printing, and may facilitate eliminating issues associated with converting and end use.

TABLE 3

| | Moisture Uptake | Surface resistivity | Volume resistivity |
|---|---|---|---|
| Example 19 (ratio 0/100) | 3.56% | 8.53E+10 | 7.43E+11 |
| Example 20 (ratio 50/100) | 3.38% | 1.34E+10 | 2.59E+11 |
| Comparative Sample 6: HP Everyday Colorlok paper (with $CaCl_2$) | 4.43% | 2.77E+09 | 2.89E+09 |
| Comparative Sample 7: JK (India) copier paper (with $CaCl_2$) | 3.78% | 3.30E+09 | 5.25E+09 |
| Comparative Sample 8: Xerox copy paper (4102) (no $CaCl_2$) | 3.61% | 2.97E+10 | 7.88E+10 |

Preparation of Surface Coating Composition (Example 21)

A surface coating composition was prepared using the metal cation-containing solution of Example 1 mixed with coating agents, inorganic fillers and organic binder, and functional additives as provided in the formulation in Table 4. The formulation was prepared in the laboratory with a batch size of 1000 grams. During preparation of the coating formulation, the defoaming agent, Foamaster® VF, was first charged into the mixing tank together with water, followed by the inorganic fillers Covercarb® 85 and Hydralux® 91. The starch, Penford Gum 280, was then added. The OBA (Leucophor® NS LIQ, Clariant, Muttenz CH) and the OBA carrier (a polyvinyl alcohol plastic material, Mowiol® 6-98 from Kuraray America Inc., Houston, Tex.) were also added. The metal cation-containing solution was added in the last step.

TABLE 4

| Example 21 Formulation | Amount (by weight) |
|---|---|
| Foamaster ® VF Antifoamer (Cognis or BASF Corp., USA) | 0.2 parts |
| Covercarb ® 85 GCC (Omya North America) | 80 parts |
| Hydralux ® 91 Kaolin Clay (KaMin, Macon, GA) | 20 parts |
| Penford Gum 280 Starch (Penford Products Co, IA) | 10 parts |
| Leucophor ® NS LIQ—Optical Brightening Agent and Mowiol ® 6-98 OBA carrier | 5 parts |
| Metal cation-containing solution of Example 1 | 10 parts |

Preparation of Surface Coated Sample and Print Quality Tests:

Non-surface sized paper was coated with the surface coating composition of Example 21 in a laboratory setting using a Daw coater and dried. A pigment ink, Hewlett Packard water-soluble pigment ink A50, was drawn down on the coated and dried paper sample using a No. 0 Mayer rod and then dried to create an Example 22. A Comparative Sample paper substrate commercially available from Office Depot that had inorganic fillers and binder similar to the Example 21 surface coating composition but without metal cation-containing solution had the HP A50 pigment ink applied in the same way as in Example 22. Two comparative media were also evaluated for color performance as indicated by color gamut, wherein the comparative media were printed using HP CM8060 Color MFP with Edgeline Technology manufactured by Hewlett-Packard Co., USA (herein collectively Comparative Samples 9). The color gamut of each printed image was recorded. The color gamut measurements were carried out on squares of primary color (cyan, magenta, and yellow) and secondary colors (red, green, and blue) plus white (un-imaged sheets) and black colors. L*a*b* values were obtained from the measurement and thereafter were used to calculate an 8-point color gamut, where the higher value of color gamut indicates that the prints show richer or more saturated colors. Both black optical density (KOD) and color gamut were evaluated for both the Example 22 and Comparative Samples 9 and the results are provided in Table 5.

TABLE 5

| Sample | KOD | Color gamut |
|---|---|---|
| Example 22 | 1.52 | 216K |
| Comparative Samples 9 | 1.28 | 175K |

Table 5 illustrates that the metal cation-containing solution of Example 1 when mixed with a surface coating agent and applied to a paper substrate (Example 22) has better print quality and promotes better image quality than the similar commercial samples which contains no metal cation-containing solution (Comparative Samples 9). The better print quality and better image quality are characterized by darker black and more vivid colors or i.e., higher KOD values and higher color gamut values, respectively.

Thus, there have been described examples of a surface treatment composition, a method of preparation thereof and a print media that includes the surface treatment composition. It should be understood that the above-described examples are merely illustrative of some of the many specific examples that represent the principles of what is claimed. Clearly, those skilled in the art can readily devise numerous other arrangements without departing from the scope defined by the following claims.

What is claimed is:

1. A surface treatment composition comprising:

a solution having a pH within a range of above pH 4 to pH 8, the solution comprising metal cations produced in situ from a metal-containing substance in a reaction with an acid having a $pK_a$ in a range of −3.0 to +3.5, the metal-containing substance having a solubility product constant $K_{sp}$ of no greater than $1\times10^{-6}$, the metal cations being dissolved in the solution and solid impurities removed; and an agent mixed with the metal cation-containing solution, the agent comprising one of a surface sizing agent to size a paper substrate and a surface coating agent to coat the paper substrate.

2. The surface treatment composition of claim 1, wherein the metal-containing substance comprises a metal element selected from the group consisting of Group I metals, Group II metals, Group III metals and transition metals.

3. The surface treatment composition of claim 1, wherein the metal-containing substance is selected from the group consisting of a metal nitrate, a metal sulfate, a metal sulfite, a metal phosphate, a metal oxide, a metal hydroxide, a metal carbonate and a metal acetate.

4. The surface treatment composition of claim 1, wherein the acid is selected from the group consisting of nitric acid, chromic acid, phosphorous acid, phosphoric acid, pyrophosphoric acid, sulfuric acid, permanganic acid and a mixture of two or more thereof.

5. The surface treatment composition of claim 1, wherein the solubility product constant $K_{sp}$ of the metal-containing substance is no greater than $0.75\times10^{-6}$.

6. The surface treatment composition of claim 1, wherein the pH of the metal cation-containing solution is within the range of pH 5.0 and pH 6.5.

7. A print media comprising the surface treatment composition of claim 1 with the coating agent, the coating agent comprising an inorganic filler and an organic binder.

8. A print media comprising the surface treatment composition of claim 1 with the surface sizing agent, the surface sizing agent comprising a starch.

9. A print media comprising:

a paper substrate comprising cellulose fibers; and a surface treatment composition applied to the paper substrate, the surface treatment composition comprising one or both of a surface sizing agent and a surface coating agent separately mixed with a metal cation-containing solution having a pH within a range of above pH 4 to pH 8 that comprises metal cations produced in situ from a metal-containing substance in a reaction with an acid having a $pK_a$ in a range of −3.0 to +3.5, wherein the metal-containing substance has a solubility product constant $K_{sp}$ of no greater than $1\times10^{-6}$, the metal cations being dissolved in the metal cation-containing solution and solid impurities removed.

10. The print media of claim 9, wherein the solubility product constant $K_{sp}$ of the metal-containing substance is no greater than $0.5\times10^{-6}$.

11. The print media of claim 9, wherein the metal cations in the metal cation-containing solution are one of $Ca^{2+}$, $Mg^{2+}$ and $Al^{3+}$, and wherein anions produced from the metal-containing substance in the reaction with the acid are one of oxide ions, carbonate ions, phosphate ions, nitrate ions, sulfate ions and acetate ions.

12. A method of preparing a surface treatment composition used in paper manufacturing, the method comprising:

reacting a metal-containing substance having a solubility product constant $K_{sp}$ of no greater than $1\times10^{-6}$ with an acid having a $pK_a$ in a range of −3.0 to +3.5 to produce a metal cation-containing solution comprising dissolved metal cations formed via in situ ionization of the metal-containing substance;

adjusting a pH of the metal cation-containing solution to within a range of above pH 4 to pH 8;

filtering the metal cation-containing solution to remove solid impurities; and mixing the metal cation-containing solution either with a surface sizing agent to form a surface sizing composition or with a surface coating agent to form a surface coating composition.

13. The method of claim 12, wherein the metal-containing substance is ground calcium carbonate, the acid comprising nitric acid, the surface sizing agent being a starch, and wherein an amount of metal cation-containing solution in the surface sizing composition is at least about 40 parts per 100 parts of starch.

14. The method of claim 12, wherein the metal-containing substance is ground calcium carbonate, the acid comprising nitric acid, the surface coating agent comprising an inorganic filler comprising calcium carbonate and kaolin clay and an organic binder comprising starch, and wherein an amount of metal cation-containing solution in the surface coating composition is about 10 parts by total weight, an amount of the inorganic filler being about 80 parts to 120 parts by total weight, and an amount of organic binder being about 10 parts by total weight.

15. The method of claim 12, further comprising applying the surface treatment composition to a paper substrate to form print media.

16. The surface treatment composition of claim 1, wherein the acid is nitric acid.

* * * * *